United States Patent [19]
McIntyre et al.

[11] 4,247,350
[45] Jan. 27, 1981

[54] SIMULATED LEATHER ACCESSORY AND METHOD OF MAKING SAME

[76] Inventors: Donald E. McIntyre, 11835 Blackheath Rd., Scottsdale, Ariz. 85254; David J. Veros, 3924 S. Bonarden La.; Duane W. Veros, 1033 E. Riveria Dr., both of Tempe, Ariz. 85282

[21] Appl. No.: 566,943

[22] Filed: Apr. 10, 1975

[51] Int. Cl.³ .............................................. B32B 3/04
[52] U.S. Cl. .............................. 156/216; 150/28 R; 156/227; 156/251
[58] Field of Search ................. 156/216, 251–252, 156/267, 204, 228, 515; 69/19; 150/28 R, 32, 35; 428/57, 58, 66, 71, 77–79, 45, 121, 124, 126, 127, 129, 130; 229/55 R

[56] References Cited
U.S. PATENT DOCUMENTS

| | | | |
|---|---|---|---|
| 1,572,831 | 2/1926 | Ayres | 69/19 X |
| 2,117,452 | 5/1938 | Robinson et al. | 156/251 X |
| 2,425,388 | 8/1947 | Oestricher | 156/515 |
| 3,147,903 | 9/1964 | Lipschutz et al. | 229/55 X |
| 3,347,733 | 10/1967 | Elver | 156/515 |
| 3,368,600 | 2/1968 | Coniker | 150/28 R |
| 3,696,771 | 10/1972 | Ambrose | 428/126 X |
| 3,790,420 | 2/1974 | Jenel | 156/251 |

Primary Examiner—David A. Simmons
Attorney, Agent, or Firm—Gregory J. Nelson

[57] ABSTRACT

An article or accessory and the method of making the article or accessory from a thermoplastic material is disclosed. Preformed and cut components are formed into an assembly on a female die portion of a fixture having a recess defined therein in the outline configuration of the article. A mating male die has an edge aligning with the recess of the female die. The male die is brought into close proximity to the female die and thermal energy applied. The assembly is sealed along an edge substantially perpendicular to the plane of the assembly leaving only a thin tear edge which can be severed. The resulting edge seal closely approximates turned edge leather construction in appearance.

5 Claims, 21 Drawing Figures

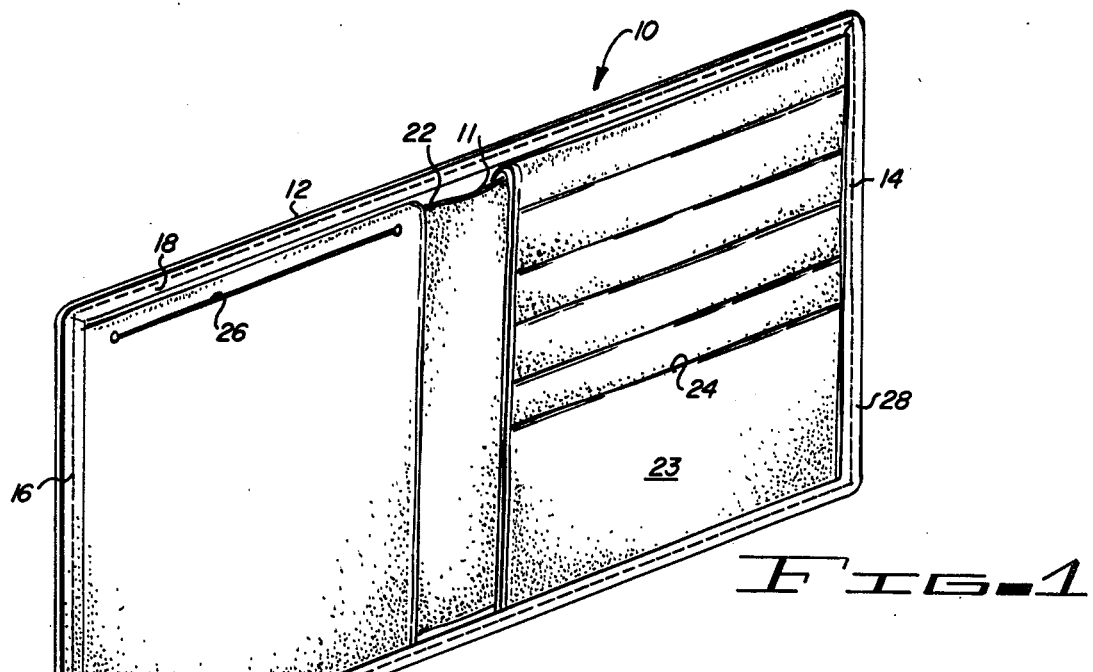
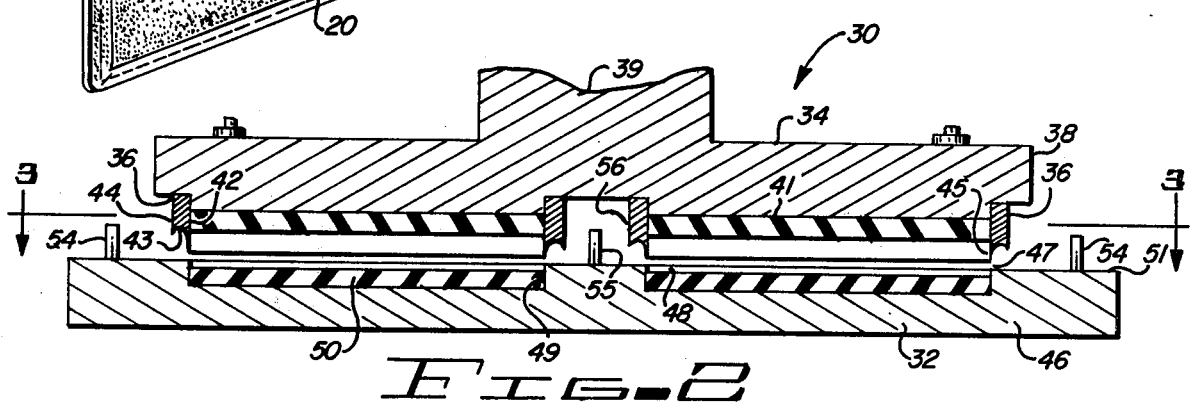
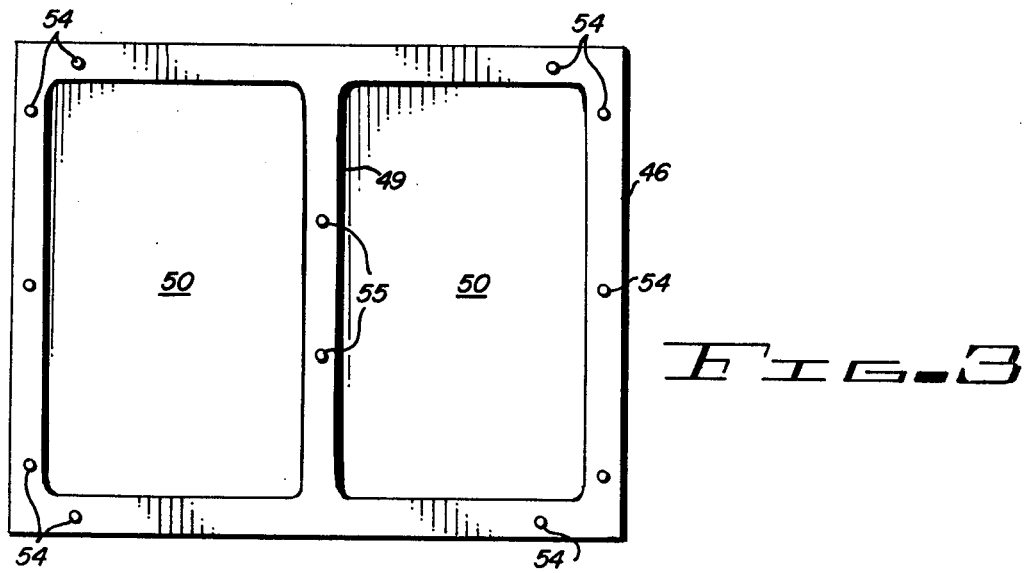

SIMULATED LEATHER ACCESSORY AND METHOD OF MAKING SAME

The present invention relates to a simulated leather accessory or article and to a method for producing simulated leather accessories or articles. More particularly, the present invention relates to a wallet construction and to a method for manufacturing simulated leather articles having an edge construction closely approximating the appearance of turned edge leather construction.

The use of a wide variety of relatively inexpensive plastic materials in the manufacture of various personal accessories has come into practice in recent years. For example, thermoplastic materials such as polyvinylchlorides ("vinyls") and polyurethanes have been generally employed in the construction of accessory items such as wallets, checkbook covers, luggage, belts, folios, brief cases, notebooks and the like. The advantage of these materials is their relative low cost coupled with availability of a wide selection of decorative effects. For example, these materials can be made to closely simulate various other materials such as genuine leather.

Several techniques have been employed by manufacturers in the construction of articles to join the mating edges of material used in accessories of this general type. Mating edges of material have been joined by overlapping and application of suitable adhesives or bonding agents to the lapped edge. These techniques have not proven satisfactory because of their unreliability, tending to separate after prolonged use, coupled with the difficulties in applying adhesive and bonding agents. This method also involves considerable hand labor. Further, this method of construction often leaves an edge which does not have the appearance or the custom look of genuine leather.

Improved techniques for joining edges of thermoplastic material have been developed to give the appearance of a genuine leather product. For example, overlapping edges of material are often joined by application of thermal or electrical energy. The application of thermal or electrical energy causes the overlapping edges to fuse forming a molecular bond. Edge construction of this type is relatively inexpensive and produces a generally tough, durable and long-lasting seal. However, conventional sealing techniques of this type result in a product which has the distinct appearance of being "an imitation" and does not realistically simulate the appearance of genuine leather. Consumers tend to regard products of this general type as being inferior in quality and hence accessories constructed in this manner have only limited consumer and sales appeal.

The construction and method of the present invention have been developed as a commercially economical solution to the problem of providing a simulated leather appearance, particularly in the edge construction of various accessories. A wide variety of materials, which are relatively inexpensive, can be used in connection with the present invention. The resulting product is economical to manufacture and in appearance closely resembles a product made of genuine leather.

Briefly, the method of the present invention contemplates first forming an appropriately configured blank of material by stamping, die cutting or by dielectrical methods from a sheet of thermoplastic material. The blank is scored using conventional apparatus inwardly of its edges to form appropriate marginal tabs. Alignment holes are provided in the blank and tabs. The blank is positioned on the female portion of a suitable die and jig assembly having projecting alignment pins. Any suitable liner or assembly, such as currency or credit card pockets are laid in position on the blank. The marginal tabs are then folded inwardly appropriately in engagement with the aligning pins. A specially configured male die is depressed and the assembly is heat sealed or dielectrically sealed inwardly of the alignment pins forming a tear seal having an edge substantially perpendicular to the blank and having the appearance of a genuine turned-edge leather construction. The border of material outwardly of the tear seal impression lines can be manaully or automatically trimmed away so that the final product can be edge buffed and stitched to further simulate the appearance of leather. An alternate method of construction in which the assembly is formed without edge folding is also disclosed. The present invention also contemplates, as an article of manufacture, an accessory manufactured in accordance with the foregoing method.

Other advantages and objects of the present invention will become readily apparent from the following drawings in which:

FIG. 1 is an interior perspective view of a wallet constructed in accordance with the present invention;

FIG. 2 is a cross-sectional view illustrating the mating male and female die members used in carrying out the method of the present invention;

FIG. 3 is a view of the female die taken along lines 3—3 of FIG. 2;

Figure 12:
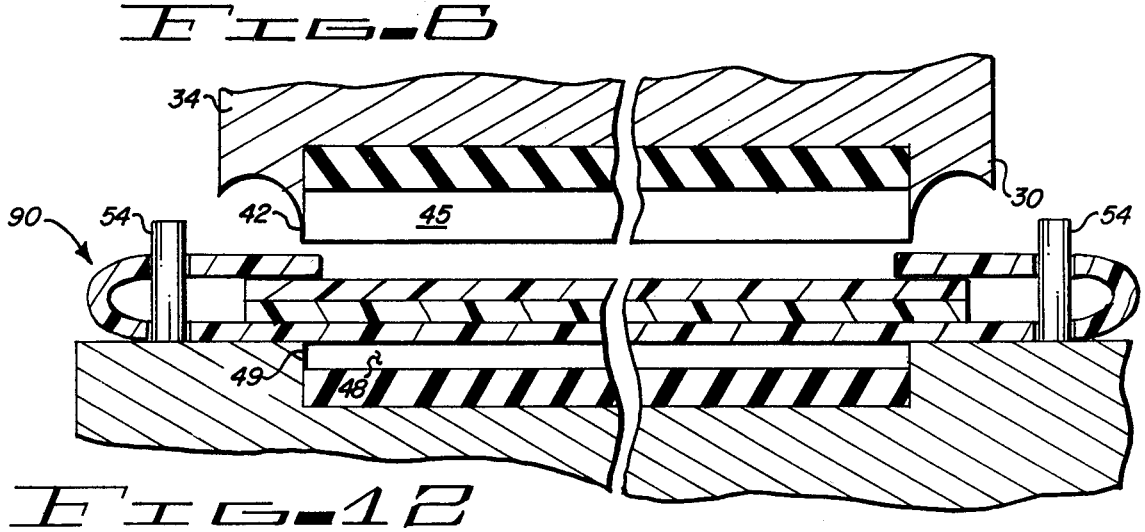
Figure 14:
Figure 13:
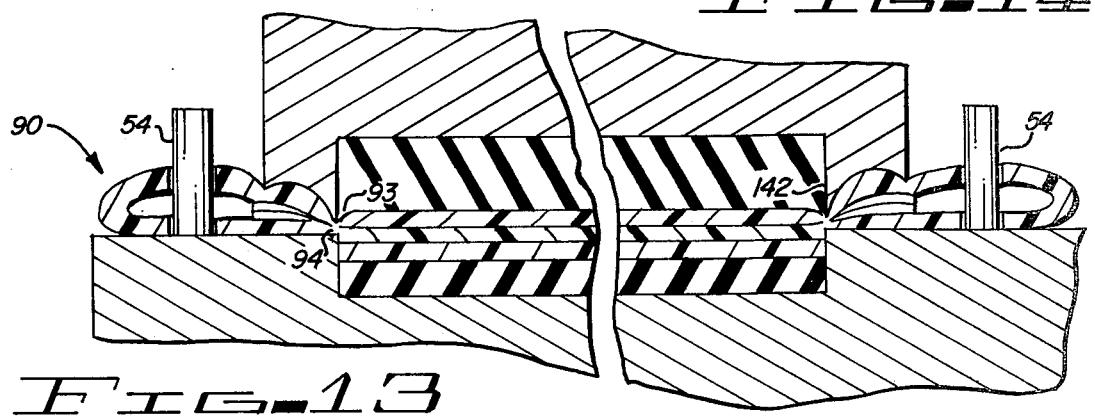

FIGS. 4 thru 11 illustrate the sequential steps involved in assembling a wallet in accordance with the present invention with FIGS. 5, 7, 9 and 11 being partial cross-sectional views as indicated;

FIG. 12 is a cross-sectional view illustrating the assembly prior to sealing;

FIG. 13 is an enlarged cross-sectional view illustrating the assembly as edge sealing occurs upon depression of the male die;

FIG. 14 is an enlarged detail view of the tear seal after sealing; and

FIGS. 15 to 21 illustrate an alternate construction method.

Referring now to the drawings, FIG. 1 illustrates an improved wallet construction in accordance with the present invention. The wallet, generally designated by the reference numeral 10, is formed of a suitable synthetic organic polymer which is heat sealable such as polyvinlychloride or polyurethane. In accordance with conventional wallet design, wallet 10 is foldable about its medial vertical axis 11 for insertion in the pocket of the user. The wallet 10 has a generally rectangular body 12 having opposite end flaps 14 and 16 which give the apperance of being folded over the interior side of the wallet. Similarly, opposite edge flaps 18 and 20 appear to be folded as is conventional in the construction of genuine leather articles. A marginally extending pocket 22 is provided for the reception of currency. The interior right-hand section 23 of the wallet carries a series of longitudinally extending overlapping panels 24 which are adapted to receive credit cards and the like. Another pocket 26 on the left-hand interior side of the wallet is for reception of additional items. Appropriate ornamental or decorative stitching 28 may be peripherally placed in the wallet 10 on the end and edge flaps. The general features of the above-described wallet construction are more or less conventional and are set forth only as being typical of the type of accessory article which can be constructed in accordance with the present invention. The present invention relates more specifically to the edge construction. Accordingly, the present invention is applicable to the construction of luggage, belts, brief cases, folios, notebooks and similar articles. However, for purposes of illustration the method of the present invention will be described with reference to the construction and manufacture of the wallet shown in FIG. 1 of the drawings.

FIGS. 2 and 3 illustrate the fixture used in cojunction with the present method. The fixture 30 serves as a jig and die and includes upper male portion 34 and a lower female or die portion 32. The upper male portion includes a pair of forming dies 36 in the general rectangular configuration of the completed wallet 10. The forming dies 36 are connected to a suitable electrical heating means, resistance or high frequency generator, and are carried on a mounting plate 38 reciprocal by means of rod 39 of a suitable hydraulic actuator not shown. As is best seen in FIG. 2, each male forming die 36 has a leading knife edge 42 and curves along surface 43 to trailing edge 44 in a "fishhook" fashion. Die 36 has a configuration or outline conforming to the desired outline of the completed article. A rectangular recess 45 is defined within the die 36 and receives a liner 41 of neoprene or other elastomeric material. The leading edge 42 of die 36 projects below the surface liner 41 leaving a predetermined clearance 47 as will be explained hereafter. In the instant case, the shape of die 36 is generally rectangular. Also, as best shown in FIGS. 2 and 3, the fixture 30 is designed to accommodate a plurality of forming dies. In this way, the efficiency of the system is increased as a multiplicity of articles can be formed in a single operational cycle.

The lower die 32 includes a base plate member 46 having a pair of rectangular recesses 48 conforming to and in alignment with forming dies 36 carried on the upper member 34. The vertical edges 49 of recesses 48 align with edges 42 of the dies 36. Each recess 48 is provided with a resilient liner 50 of an elastomeric material such as neoprene. The thickness of the liner 50 can be varied but will be preferably such that a predetermined clearance exists between the upper surface of the liner and the upper surface 51 of the plate member 46. Upon application of pressure and electrical or thermal energy, some compression of the thermoplastic material into the clearance area will be experienced, as will be explained in greater detail hereafter.

Peripherally spaced about base 32 at predetermined locations are a plurality of projecting aligning pins 54. Pins 54 are arranged so they do not interfere with the mating of the fixture members as they are spaced outwardly of mounting plate 38. Medially positioned pins 55 extend between the adjacent recesses 48 and are received in clearance opening 56 in upper mounting plate 38.

Figures 4, 5:
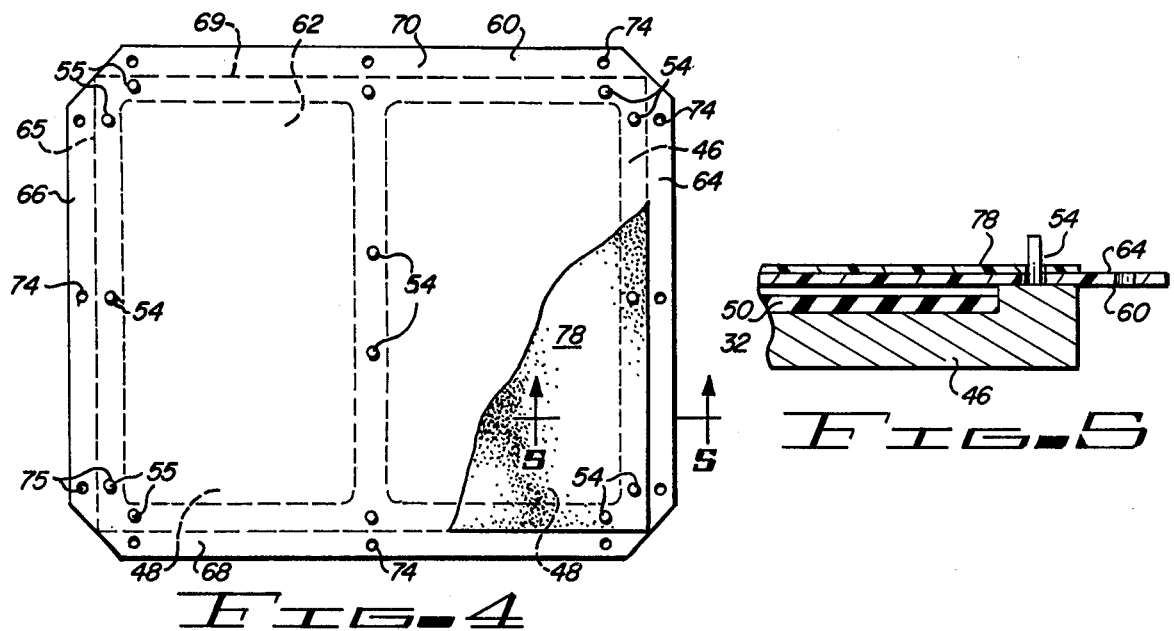

The present invention and the operation of the fixture 30 will be better understood from the following description of the method of making a wallet utilizing the method. Referring specifically to FIGS. 4 thru 11, FIG. 4 is a plan view of the base or female member 32 of fixture 30 having an appropriately formed blank 60 of thermoplastic material positioned thereon. Blank 60 has a generally rectangular body portion 62. The blank can be formed by any conventional operation such as stamping, die cutting or dielectrical forming. Blank 60 carries opposite end flaps 64 and 66 attached to body 62 along preformed score lines 65. The corners of flaps 64 and 66 are preferably tapered or beveled as shown. Longitudinal edge flaps 68 and 70 are formed at opposite edges of body 62 by longitudinally extending score lines 69. Holes 75 are provided in the main body portion 62 of the blank 60 and are positioned to align with pin 54 of the lower fixture member 32. A second series of perforations 74 are provided in flaps 64, 66, 68 and 70 spaced outwardly from the respective score lines the same distance as holes 75 are inwardly displaced. A rectangular liner 78 formed of a suitably decorated sheet of thermoplastic material overlays the rectangular body portion 62 of blank 60. Liner 78 is provided with perforations 80 which are adapted to align with the pins 54 of base member 32. FIG. 5 also illustrates the initial assembly step. The location of recesses 48 in the subjacent die member 32 are shown in dotted lines.

Figures 6, 7:
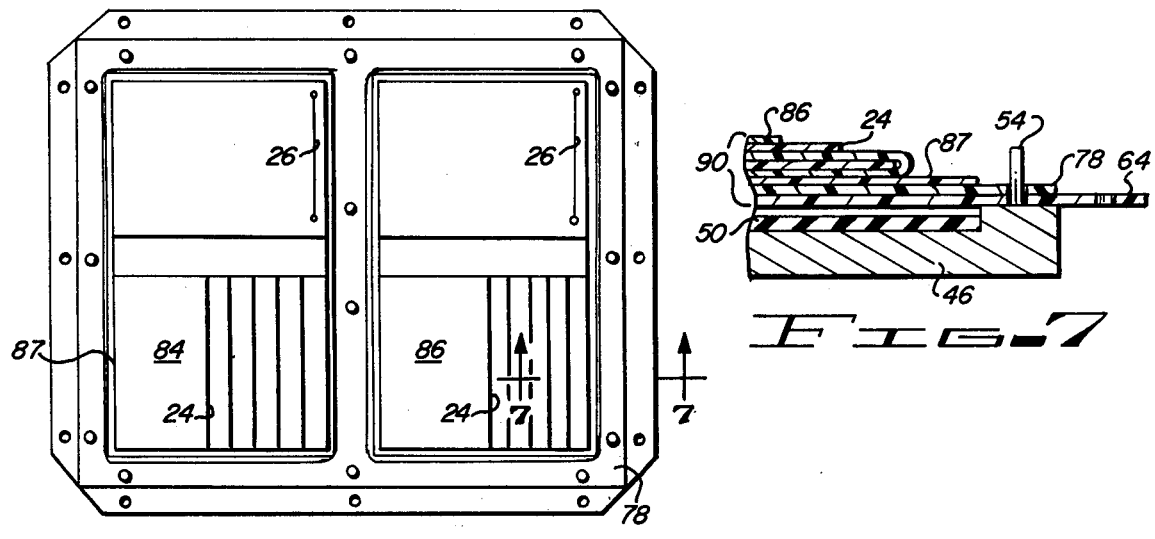

The next step in the sequence of operations is illustrated in FIGS. 6 and 7. When blank 60 and liner 78 are suitably positioned in the lower member 32, preformed assemblies 84 and 86 are positioned on the liner. Each of the assemblies 84 and 86 is in the form of a multipocket panel which carries pocket 26 and credit card pockets 24. A peripheral edge 87 extends around each of the assemblies. These assemblies are more or less conventional and can be in any desired configuration.

Figure 8:
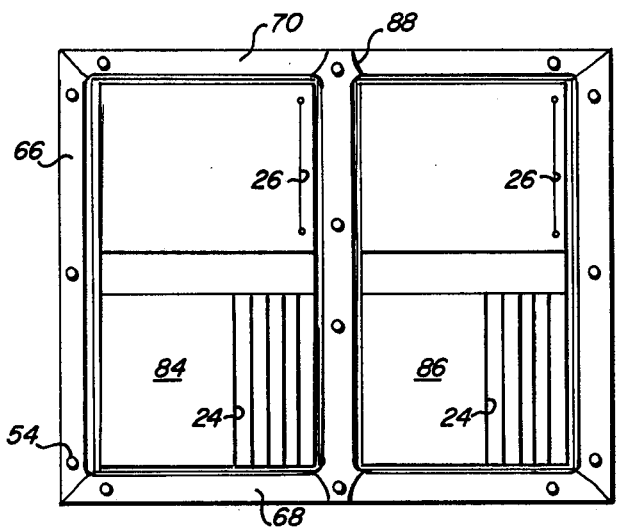
Figure 9:
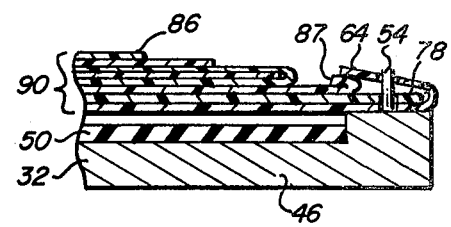

Referring now to FIGS. 8 and 9, edge flaps 68 and 70 are turned or folded inwardly with holes 74 engaging the respective aligning pins 54 of the fixture. Similarly, end flaps 64 and 66 are turned inwardly with holes 75 in the end flaps engaged on their respective aligning pins. The pins serve to facilitate assembly and retain the assembly in the proper position during subsequent sealing. An appropriate medial or central strip 88 is placed on the assembly engaging the medial row of aligning pins 55. It is noted that edges 64, 66, 68 and 70 are preferably for convenience of construction attached to the main blank and folded inwardly. It is also within the scope of the invention to provide these edges as strips such as medial strip 88, and place them in peripheral position on pins 54.

Figure 10:
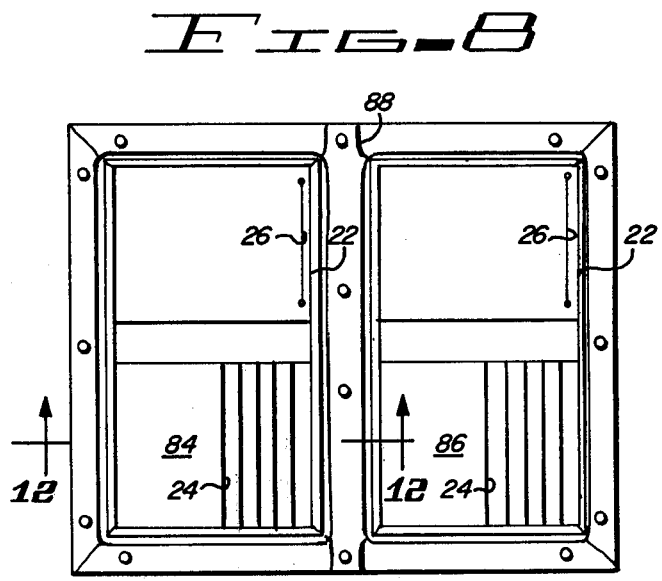
Figure 11:
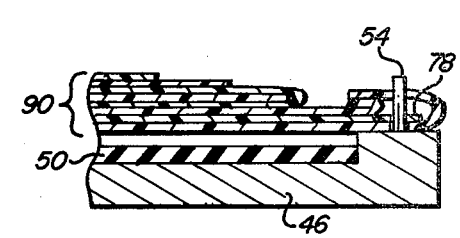

As best seen in FIGS. 10 and 11, it will be seen that the medial strip 88 and the edge and end flaps all extend inwardly of the aligning pins and overlap the liner 78 and the edges 87 of the pocket assemblies. Two separate wallet assemblies 90 have now been positioned in the fixture ready for the edge sealing step. It will be apparent that any desired number of wallets can be formed on a single fixture.

Subsequent to assembling and aligning the components in the fixture, upper die member 34 is depressed or lowered by extention of shaft 39. FIG. 12 is a cross-sectional illustration showing the relative position of the completed wallet assembly 90 in the fixture prior to depression of the male die member 36. Leading edge 42 of the die member 34 aligns with the vertical wall 49 which forms the recess 48 in the lower member 32. High frequency current is applied as die member 42 engages and compresses the material as shown in FIG. 13. The high frequency current forms a seal assembly which can be later cut or manually separated as desired. In the sealing process, die member 42 compresses the assembly 90 to cause a part of the assembly 90 to be forced into the recess 48 in the female die. The upper part of the assembly is received in recess 45 in the upper member 34. The liners 46 and 50 provide resiliency and prevent damage to the assembly during compression. It should be noted that the depth of each of the recesses 45 and 48 approximates one-half of the thickness of assembly 90. In this way, the seal is formed with only a thin edge 94 remaining at the approximate mid-point of the thickness of the assembly 90. Thus, edge 49 of the female die and leading edge 42 of the male die 42 together form a sharp, clean vertical seal at 93.

As seen in FIG. 14, the vertical tear seal 93 extends almost through the thickness of the assembly 90 leaving only a thin edge 94 to be subsequently separated. After the assembly has been removed from the fixture, the completed wallets can be torn from the assembly along their respective seal lines 93. The border material remaining can be discarded or recycled. It will be noted that after separation, the edge of each of the completed wallets comprises a unitary fused junction which has the appearance of turned-edge leather construction. The fusion of the various layers of assembly occurs generally along a vertical, rather than a horizontal line. To further enhance the appearance of the assembly, edge buffing and peripheral stitching can be applied.

FIGS. 15 through 21 illustrate an alternate method of forming an accessory in accordance with the present invention. The method of construction shown in these figures utilizes the same fixture 30 and the edge sealing method described above and is again described with reference to the construction of a wallet generally as shown in FIG. 1. The method of construction described with reference to these figures is particularly applicable to certain types of accessories and in some cases is more efficient as requirement of inwardly folding an edge flap during construction is eliminated. Further the application of stitching is easier as the completed item is retained in discardable border until the sewing operation is completed. This results in increased operational efficiency.

Figures 15, 16:
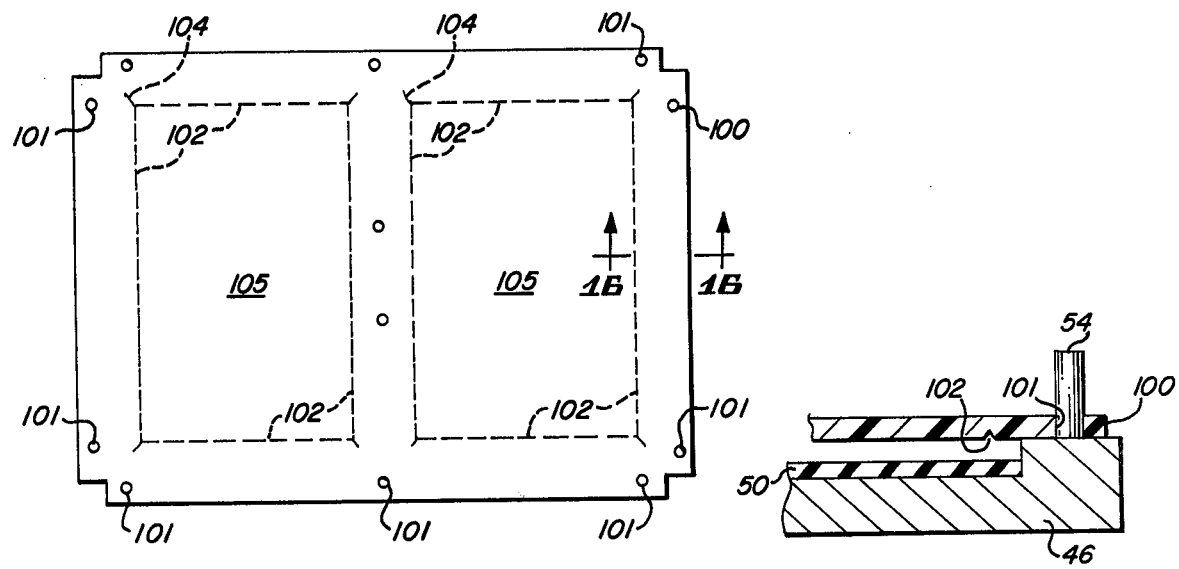

Referring to FIG. 15, the first step in the assembly comprises inserting a preformed thermoplastic blank 100 into the lower die member 46 of the fixture 30. Blank 100 has been punched with peripheral holes 101 which are adapted to engage aligning pins 54 of the fixture. In addition, the surface of blank 100 adjacent die 46 is appropriately scored along lines 102 which define a stripable panel 105. The score lines 102 conform generally to the shape of the wallet 10 and are spaced slightly inwardly of the peripheral edge of the completed items. Diagonal score lines 104 extend to a location at the corner of the completed item.

Figures 17, 18:
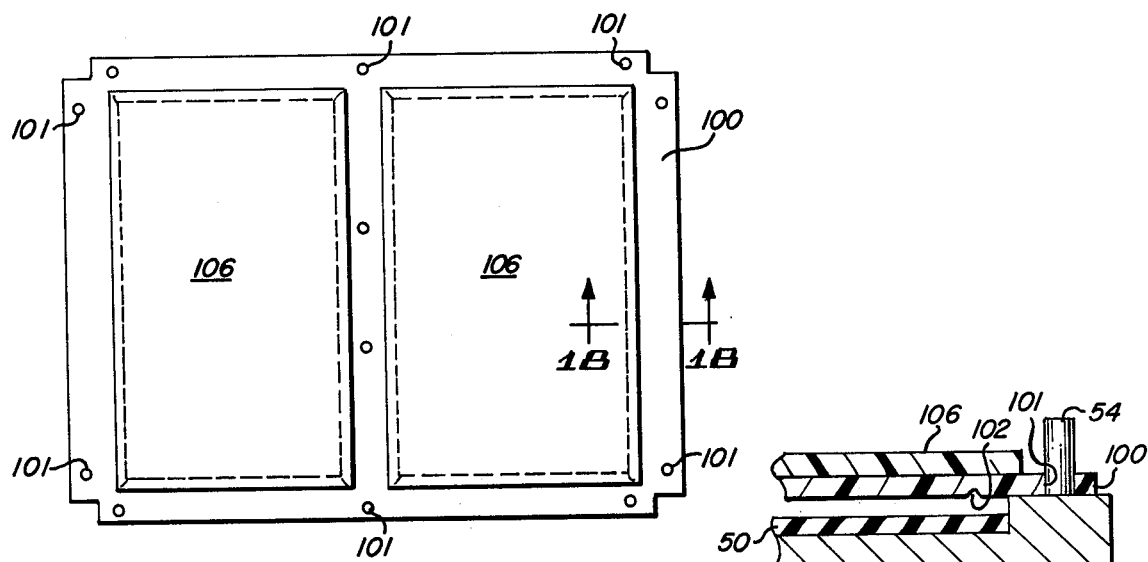

In the method of construction shown in FIGS. 15 through 21, the assembly is built up beginning with blank 100. The panel 105 within score lines 102 will eventually be stripped away as will be explained hereafter. Referring to FIGS. 17 and 18, subsequent to loading blank 100 into the die assembly, preformed pocket assembly 106 is placed over blank 100 and positioned overlapping score lines 102. Assembly 106, as has been described above, can be any suitable arrangement as desired and can include appropriate pockets and panels for reception of credit cards and currency.

Figures 19, 20:
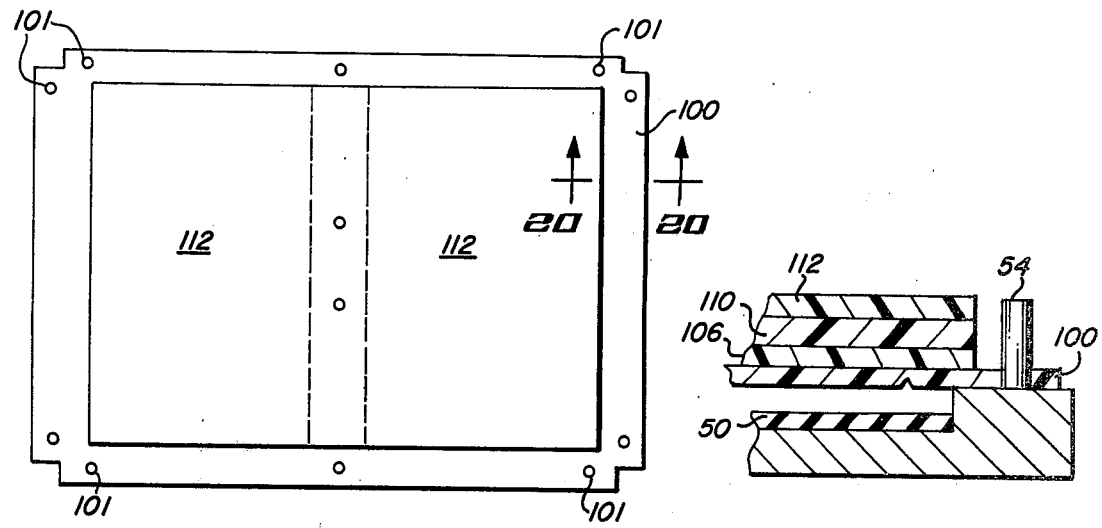
Figure 21:
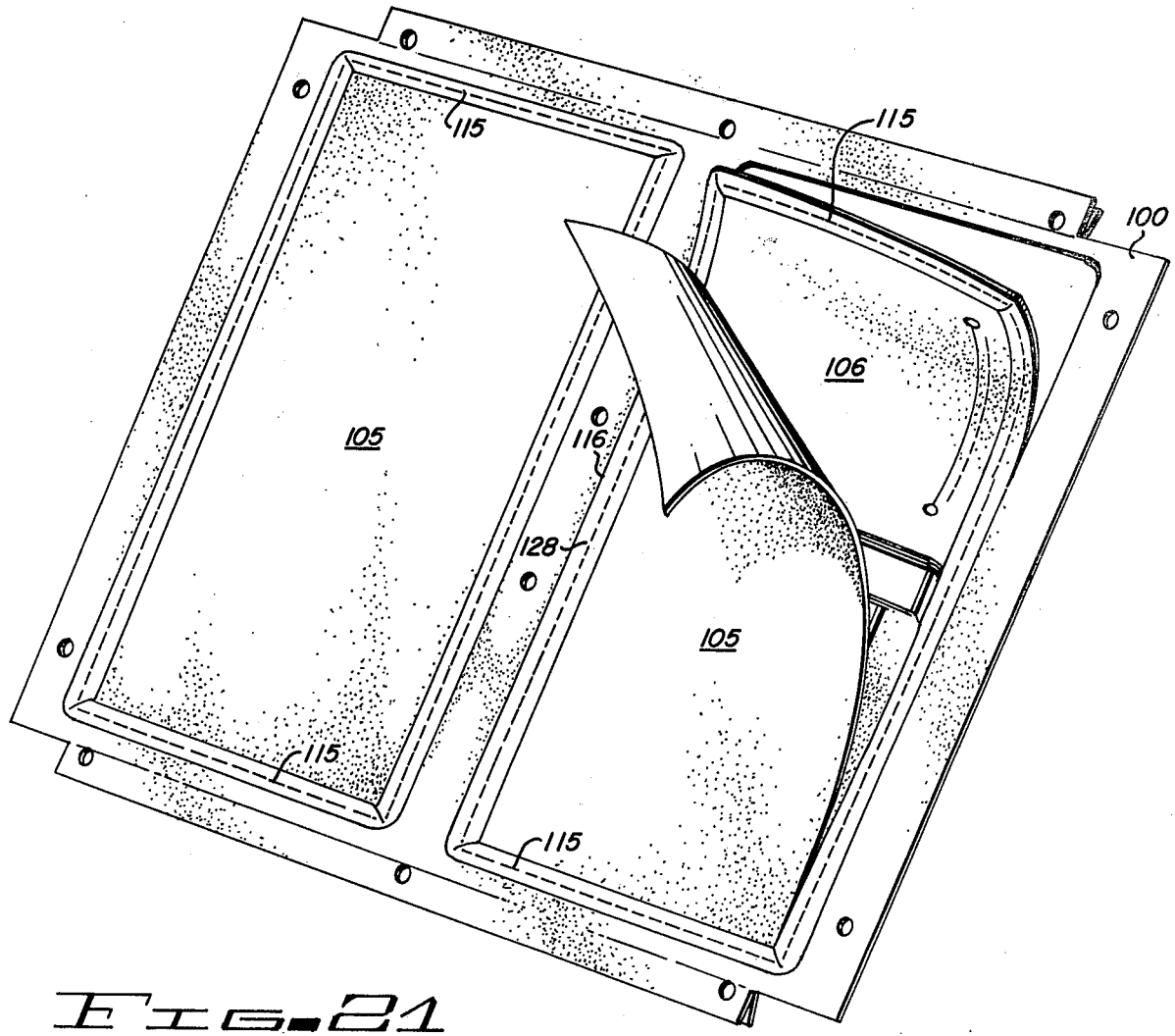

Referring now to FIGS. 19 and 20, an appropriate thermoplastic liner 110 and outer cover panel 112 are placed in position to form a completed assembly. The upper die, not shown, and lower die member 46 are brought into close proximity in the presence of heat and the tear seal assembly is formed defining the periphery of the completed product. The tear seal and the forming dies have been described in detail above and further description is not necessary here. The tear seal will be formed in the area between score lines 102 and aligning pins 54. The sealed, completed assembly is removed from the lower member 46 and is now ready for finishing operations. Preferably, decorative stitching 115 is peripherally applied inwardly of the tear seal 116. The decorative stitching 115 is done by machine operation to the completed assembly prior to any stripping or separation operation. In this way, the stitching operation is facilitated in that the operator performing the stitching operation can maintain the material to be stitched in a flat, properly oriented position with ease. After stitching 115 has been completed, panel 105 defined within score lines 102 is stripped away as is best seen in FIG. 21 which shows the interior of the sealed, stitched wallet assembly. This exposes the preformed pocket assembly 106 leaving a marginal strip 128 extending to tear seal line 116. The completed product can then be severed from the blank along tear seal lines 116. As pointed out above, construction in this way avoids the requirement of having to inwardly fold any marginal edges or flaps in the assembly method as the remaining marginal strips 128 have the appearance of a folded edge. The resulting article appears the same or identical to that formed by the alternate method which involves folding an edge flap inwardly. The completed article may be edge buffed if desired, and has the completed appearance of a genuine leather article.

It will be obvious that the above-described operational steps can be carried out or implemented in various ways. For example, it may be convenient to perform the operational steps on a rotating turn-table or sequentially on a conveyor line. The fusion can be applied by conventional methods such as dielectrical methods. Typically, a sealing can be accomplished by using a Thermatron sealing press as manufactured by Solidyne, Inc.

It will be apparent that the method of the present invention is applicable to a wide range of items. The foregoing description as applied to the manufacture of a wallet is by way of illustration only. The unique edge fusion method can be applied to a range of thermoplastic materials to simulate the appearance of turned-edge leather construction. The resulting edge fuses along a vertical line leaving only a thin attached string which may be easily separated from the formed item. The method avoids the necessity of fusing glues and adhesives. The undesirable appearance of having die marks on the flat surfaces of the item is avoided. This characteristic which impairs or detracts from the appearance of the surface texture or decoration is typical of conventional sealing methods. For example, if the material has a grain simulating genuine leather, no sealing line inwardly of the edge of the article appears which would diminish the appearance of the article. This line is characteristic of prior methods and regarded by consumers as an imitation substantially diminishing sales appeal.

It will be obvious that various changes of the method will be made to accommodate the fabrication of various items. The configuration of the dies and fixture can be varied to fabricate many items. Similarly, single or multiple items or accessories can be formed in a single operational cycle. The tear seal edge can be used in a wide range of products using thermoplastic materials.

In summary, it is clear from the above that the present invention provides an improved method for fabricating simulated leather accessories. The present method is simple, convenient and economical requiring a minimum of hand labor and resulting in a high quality product with substantial consumer appeal. It will be apparent to those skilled in the art to make various changes, alterations and modifications to the construction and method described herein. To the extent that these alterations, changes and modifications do not depart from the spirit and scope of the appended claims, they are intended to be encompassed therein.

We claim:

1. A method of producing an edge on a thermoplastic item having the appearance of turned-edge leather construction comprising:
   (a) forming a blank of thermoplastic material having a body portion and a projecting flap, said flap being joined to said body portion along a score line;
   (b) positioning said blank in a fixture, said fixture having,
      (i) a first die member having a recess of predetermined depth defining the shape of the item to be produced;
      (ii) a second die member having a projecting edge in alignment with said recess; and
      (iii) aligning and retaining means associated with said fixture;
   (c) folding said flap along said score line to overlie the body portion of said blank forming an assembly with said assembly engaged by said aligning and retaining means; and
   (d) bringing said die members together with said projecting edge and contacting said flap and applying pressure and thermal energy to said blank in the projected flap area along a line substantially parallel to said score line and along a plane substantially perpendicular to said blank thereby fusing said blank flap and body and causing said assembly to at least partially compress into said recess in said first die member fusing the layers along a generally perpendicular edge thereby forming a thin separable tear seal intermediate of the upper and lower faces of said assembly leaving a turned edge having a surface devoid of fusion lines.

2. The method of claim 1 wherein the projecting die edge of said first die member is formed with a leading edge a trailing edge and a convexity therebetween.

3. The method of claim 1 wherein said thermal energy is applied by dielectrical means.

4. The method of claim 1 further including the step of severing the assembly along said tear seal and placing appropriate decorative stitching thereon.

5. The method of claim 1 further including the step of inserting a preformed assembly having a thermoplastic edge portion intermediate said flap and body portion.

* * * * *